(12) United States Patent
Reed et al.

(10) Patent No.: US 8,807,437 B2
(45) Date of Patent: Aug. 19, 2014

(54) PAYMENT CARD SYSTEM AND METHOD

(75) Inventors: Sonia Reed, Danville, CA (US);
Kenneth M. Sippola, San Francisco, CA (US); William Thaw, San Mateo, CA (US); Mustafa Top, San Ramon, CA (US); Steven Crouch-Baker, Palo Alto, CA (US); Francis Louis Tanzella, San Carlos, CA (US); Esperanza Alvarez, Menlo Park, CA (US); John Stephens Stotts, Santa Clara, CA (US); William B. Bedwell, Palo Alto, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 13/412,422

(22) Filed: Mar. 5, 2012

(65) Prior Publication Data
US 2012/0223146 A1 Sep. 6, 2012

Related U.S. Application Data

(60) Provisional application No. 61/449,473, filed on Mar. 4, 2011.

(51) Int. Cl.
*G06K 19/02* (2006.01)
(52) U.S. Cl.
USPC .......................................... 235/488; 235/487
(58) Field of Classification Search
USPC .................................. 235/487, 488, 492, 494
See application file for complete search history.

(56) References Cited

U.S. PATENT DOCUMENTS

| | | | | |
|---|---|---|---|---|
| 4,899,039 A | * | 2/1990 | Taylor et al. | 250/208.2 |
| 4,917,292 A | * | 4/1990 | Drexler | 235/488 |
| 5,235,243 A | * | 8/1993 | Tong | 313/479 |
| 5,272,216 A | * | 12/1993 | Clark et al. | 525/362 |
| 5,521,433 A | | 5/1996 | Hirata | |
| 5,698,839 A | * | 12/1997 | Jagielinski et al. | 235/493 |
| 6,916,354 B2 | | 7/2005 | Elliott | |
| 2009/0250521 A1 | | 10/2009 | Fujita et al. | |
| 2010/0021740 A1 | | 1/2010 | Tanaka et al. | |

FOREIGN PATENT DOCUMENTS

| | | |
|---|---|---|
| EP | 0656607 A2 | 6/1995 |
| EP | 1962233 A1 | 8/2008 |
| JP | 07-290869 A | 11/1995 |

(Continued)

OTHER PUBLICATIONS

International Search Report and Written Opinion mailed Sep. 25, 2012 in PCT Application No. PCT/US2012/027771, 8 pages.

(Continued)

*Primary Examiner* — Daniel St Cyr
(74) *Attorney, Agent, or Firm* — Kilpatrick Townsend & Stockton LLP

(57) ABSTRACT

Embodiments of the invention relate to payment cards and methods for making payment cards. In one embodiment, a card comprises a first layer and a second layer adjacent to the first layer. The second layer comprises a plurality of particles comprising metal, and the plurality of particles comprise at least about 15 volume % of the second layer. In another embodiment, a mixture is prepared comprising polymer and a plurality of particles comprising metal. The plurality of particles comprise at least about 15 volume % of the mixture. The mixture is pressed and an outer layer is applied. The mixture and outer layer are then cut to form the card.

18 Claims, 5 Drawing Sheets

(56) References Cited

FOREIGN PATENT DOCUMENTS

| WO | 02/19780 A1 | 3/2002 |
| WO | 03/067512 A1 | 8/2003 |
| WO | 2007/098728 A1 | 9/2007 |

OTHER PUBLICATIONS

Extended European Search Report mailed Jun. 10, 2014 in EP Application No. 12755598.5, 8 pages.

* cited by examiner

PAYMENT CARD SYSTEM AND METHOD

CROSS-REFERENCES TO RELATED APPLICATIONS

This application claims the benefit of U.S. Provisional Application No. 61/449,473, filed Mar. 4, 2011, entitled "PAYMENT CARD SYSTEM AND METHOD," which is herein incorporated by reference in its entirety for all purposes.

BACKGROUND

A market exists for payment cards with an enhanced appearance and feel that appeal to a card issuer's elite customers. One approach practiced by some issuers is to manufacture metal cards. The use of metal cards, however, can create problems with electrostatic discharge (ESD) during use. ESD relates to sudden and momentary electric current that flows between two objects at different electrical potentials and is caused by direct contact or is induced by an electrostatic field. It is known that ESD may cause a temporary interruption or permanent damage to an access device (e.g., a point of sale terminal) when a payment card interacts with the terminal to conduct a transaction. Due to the electrical properties of metal cards, they are prone to cause ESD events that can disturb the payment transaction or damage the point of sale terminal.

Another problem associated with the fabrication of metal cards is materials and manufacturing costs. Many aesthetically desirable metals are impractical for use in a payment card due to their high cost. Moreover, manufacturing of metal cards can involve fabrication techniques machinery that are inconsistent with existing payment card production infrastructure. The addition of new machinery and processing steps can result in further cost to the issuer.

Accordingly, there is a need in the art for payment cards that have the appearance and feel of metal, that can be manufactured from inexpensive materials and by processes consistent with existing manufacturing infrastructure, and that do not have the electrostatic discharge problems associated with existing metal cards.

Embodiments of the invention can address the above problems, and other problems, individually and collectively.

BRIEF SUMMARY OF THE INVENTION

Embodiments of the invention relate to payment cards and methods for making payment cards.

One embodiment of the invention is directed to a card comprising a first layer and a second layer adjacent to the first layer. The second layer comprises a plurality of particles comprising metal, and the plurality of particles comprise at least about 15 volume % of the second layer.

Another embodiment of the invention is directed to a method for making a card. The method comprises preparing a mixture comprising polymer and a plurality of particles comprising metal. The plurality of particles comprise at least about 15 volume % of the mixture. The mixture is pressed and an outer layer is applied. The mixture and outer layer are then cut to form the card.

These and other embodiments of the invention are described in further detail below.

DETAILED DESCRIPTION OF THE INVENTION

Embodiments of the invention are directed to payment cards and methods for making payment cards that have the appearance and feel of metal, without the electrostatic discharge problems associated with existing metal payment cards.

Figure 1:
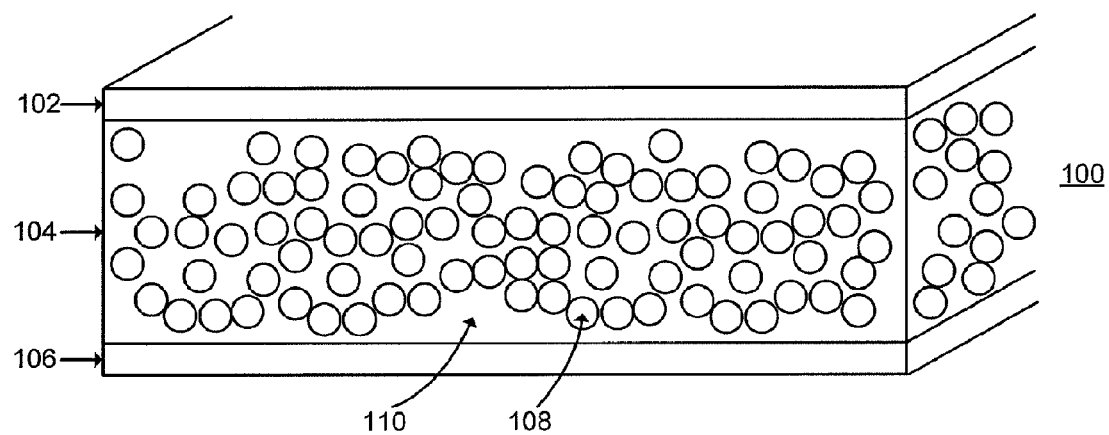
FIG. 1 is a three-dimensional side view of a card according to embodiments of the invention.

FIG. 1 shows a side-view of a card 100 according to embodiments of the invention. The card 100 can include a first layer 102, a second layer 104, and a third layer 106.

To create the appearance and feel of metal, the second layer 110 can include a plurality of particles 108 including metal. For example, the metal particles 108 can include tungsten, copper, nickel, iron, gold, silver, aluminum, platinum, steel, bronze, or any other metal or alloy suitable to create the desired weight and appearance of the card 100. Combinations of particles comprising these materials can also be used in embodiments of the invention. Tungsten is a desirable choice for the metal particles 108 since it has a high density (i.e. about 19.3 grams per cubic centimeter). In some embodiments, the particles may comprise a material with a density greater than about 15 grams per cubic centimeter. Tungsten is also less expensive than other high density metals. For example, the cost of tungsten can be two to three orders of magnitude less than the cost of gold. Furthermore, tungsten is considerably less toxic than other heavy metals such as lead. Since tungsten has a wide variety of industrial applications, it is readily available on the market at a relatively low cost.

Figure 2:
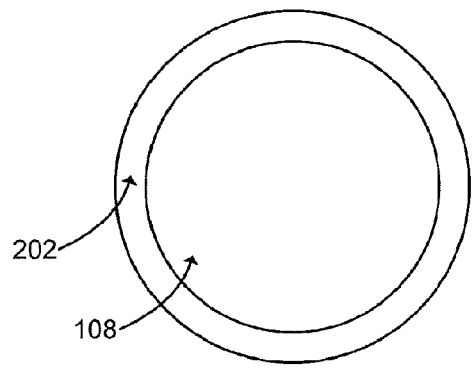
FIG. 2 is a cross-sectional view of a metal particle according to embodiments of the invention.

FIG. 2 shows a cross-sectional view of a metal particle 108 according to embodiments of the invention. To reduce the overall conductivity of the card 100, and thus reduce the likelihood of electrostatic discharge during interaction with an access device, the metal particles 108 can include an outer coating 202. The outer coating 202 can include inorganic dielectric materials such as metal-oxides, metal-nitrides, metal-carbides or any other suitable dielectric material. For example, a tungsten-oxide coating can be applied to the metal particles 108 via a chemical vapor deposition process. A gaseous mixture containing oxygen, tungsten vapor (e.g., tungsten hexacarbonyl or tungsten hexafluoride), and a carrier gas (e.g., hydrogen, nitrogen, or argon) can be passed over the metal particles 108 at high temperatures (e.g., 300 too 500 degrees Celsius) to form the outer coating 202. Similarly, a tungsten-nitride coating can be applied to the metal particles 108 using the above process by replacing oxygen with ammonia in the gaseous mixture to form a tungsten-nitride layer. To form a layer of tungsten-carbide, a gaseous mixture containing tungsten (e.g., tungsten hexacarbonyl or tungsten hexafluoride), hydrogen, a carbon-containing gas (e.g., propane thermally pre-activated at 500 to 800 degrees Celsius), and an inert gas (e.g., argon) can be passed over the metal particles 108 at high temperatures (e.g., 400 to 900 degrees Celsius). In embodiments of the invention, any other suitable coating technique and oxides, nitrides, or carbides of any suitable metal can be used to form the outer coating 202.

The outer coating 202 may have any suitable thickness. For example, the thickness may be less than about 100 microns, or less than about 50 microns.

Organic dielectric materials can also be used to form the outer coating 202. Organic insulators typically have a large dielectric constant ranging from approximately 3 to 6, and can be applied using a number of deposition processes. For example, electrocoating can be used wherein the metal particles 108 are immersed in a bath of organic dielectric particles and a current is applied. The oppositely charged organic particles are then attracted to the metal particles 108 thus forming an even continuous and thin (e.g., less than 30 micron) film on the surface of the metal particles 108. Anodic or cathodic coating methods can be used, and materials such as epoxy, epoxy-acrylate, polyimide, or any other suitable dielectric materials can be applied. The metal particles 108 can be allowed to react with a coupling agent (e.g., a silane based agent) prior to immersion in the bath to ensure bonding between the metal particles 108 and the organic coating.

Returning to FIG. 1, the second layer 110 can also include polymer 110. The polymer 110 can comprise a polymeric material. Examples of polymeric materials can include polyvinyl chloride, polyvinyl chloride acetate, polyethylene terephthalate, polybutylene terephthalate, polycarbonate, polypropylene, or any other suitable thermoplastic or thermoset. Homopolymers, co-polymers, and polymer blends can also be used in embodiments of the invention. Polyvinyl chloride (PVC) is a desirable material since it has good properties (e.g., rigidity).

The distribution of the metal particles 108 in the polymer 110 is a factor for creating a metallic look and feel for the card 100.

A card according to an embodiment of the invention can have any suitable configuration. For example, a payment card according to an embodiment of the invention can be about 86 millimeters long, about 54 millimeters wide, and about 0.7 to 0.9 millimeters thick. In other embodiments, the card 100 may have dimensions greater than about 65 millimeters long, 40 millimeters wide, and 0.4 to 0.6 millimeters thick.

The metal particles 108 can have any suitable size. For example, the size (e.g., diameters) of the metal particles 108 can be smaller than the thickness of the card 100. For example, the particles 108 can have a diameter smaller than the thickness of the card 100 by a factor of about 10 to 100. In some embodiments, the metal particles 108 can have diameters less than about 50 microns, or even less than about 20 microns.

The weight of the card 100 can be related to the packing density of the metal particles 108 in the polymer 110. The volume percentage of the particles 108 can vary. For example, in embodiments of the invention, the particles 108 can comprise at least about 15 volume % of the second layer 104. In some embodiments, the metal particles 108 can be less than about 50 volume % of the second layer 104. In some cases, a volume percentage of particles above 50% may lead to the addition of a plasticizer to improve workability when manufacturing the second layer 104. To achieve a high packing density, and thus a heavier card, a narrow size distribution of spherically shaped particles is desired. A commercial product that can be used for the metal particles 108 in embodiments of the invention is Technon™ tungsten particles produced by Tungsten Heavy Powers, Inc. which have an approximate diameter of 40 microns or greater and an approximate particle size distribution of 100 to 400 Mesh. Other particles having these dimensions and properties can alternatively be used.

As seen in FIG. 1, the card 100 can include a first layer 102 and a third layer 106. The first layer 102 and third layer 106 can be transparent polymer layers applied by a lamination process (described in further detail below). Such laminated layers can provide a protective surface on one or both sides of the card 100. PVC, Polyvinyl chloride acetate, or any other suitable transparent material can be used to form the first layer 102 and third layer 106.

Figure 6:
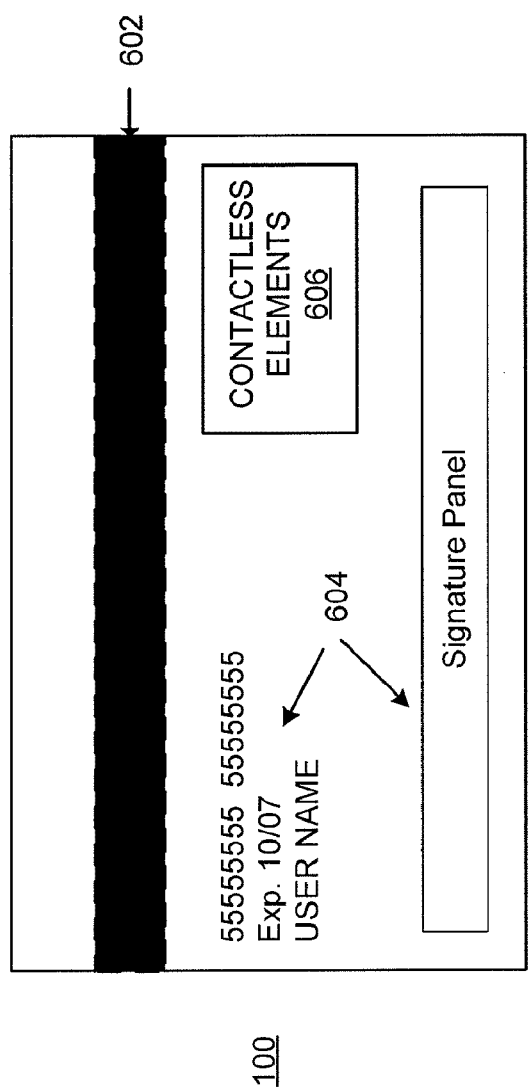
FIG. 6 is a schematic depiction of a payment card according to embodiments of the invention.

As seen in FIG. 6, the card 100 can also include aesthetic features 604 such as pigments, graphics, logos, holograms, a signature panel, cardholder name, account number, expiration date, etc. These features can be positioned at the first layer/second layer interface and/or the second layer/third layer interface, part of and contained within the first later 102 and/or the third layer 106, and/or on an outer surface of the first layer 102 or the third layer 106.

For communicating with an access device to conduct a transaction, for example, the card 100 can also include a magnetic stripe 602 and/or contactless elements 606 such as a computer readable medium, processor, and antenna. For example, the magnetic stripe 602 can be positioned at the first layer/second layer interface or the second layer/third layer interface Alternatively, the magnetic stripe 602 can be part of and contained within the first layer 102 or the third layer 106. The contactless elements 606 can be part of and contained within the second layer 104, positioned at the first layer/second layer and/or second layer/third layer interface, and/or part of and contained within the first layer 102 and/or the third layer 106.

The magnetic stripe 602 and the contactless elements 606 (e.g., the computer readable medium) can store information such as financial information, transit information, access information, etc. The financial information can include bank account information, loyalty account information (e.g., a loyalty account number), a bank identification number (BIN), credit or debit card number information, account balance information, an expiration date, consumer information such as name and date of birth, etc. In some embodiments, information stored in the magnetic stripe 602 and/or contactless elements 606 may in the form of data tracks that at traditionally associated with credit cards. Such tracks can include Track 1 and Track 2. Track 1 ("International Air Transport Association') stores more information than Track 2, and contains the cardholder's name, account number, and discretionary data. This track is sometimes used by airlines when securing reservations with a credit card. Track 2 ("American Banking Association) is currently most commonly used. This is the track that is read by ATMs and credit card access devices. The American Banking Association designed the specifications of this track and all world banks abide by it. It contains the cardholder's account, encrypted PIN, and other discretionary data.

The contactless elements 606 may be capable of transferring and receiving data using near field communications ("NFC") capability in accordance with a standardized protocol or data transfer mechanism (e.g., ISO 14443/NFC). Near field communications capability is a short-range communications capability, such as RFID. Bluetooth™, infra-red, or other data transfer capability that can be used to exchange data between the card 100 and an access or other interrogation device.

Figure 4:
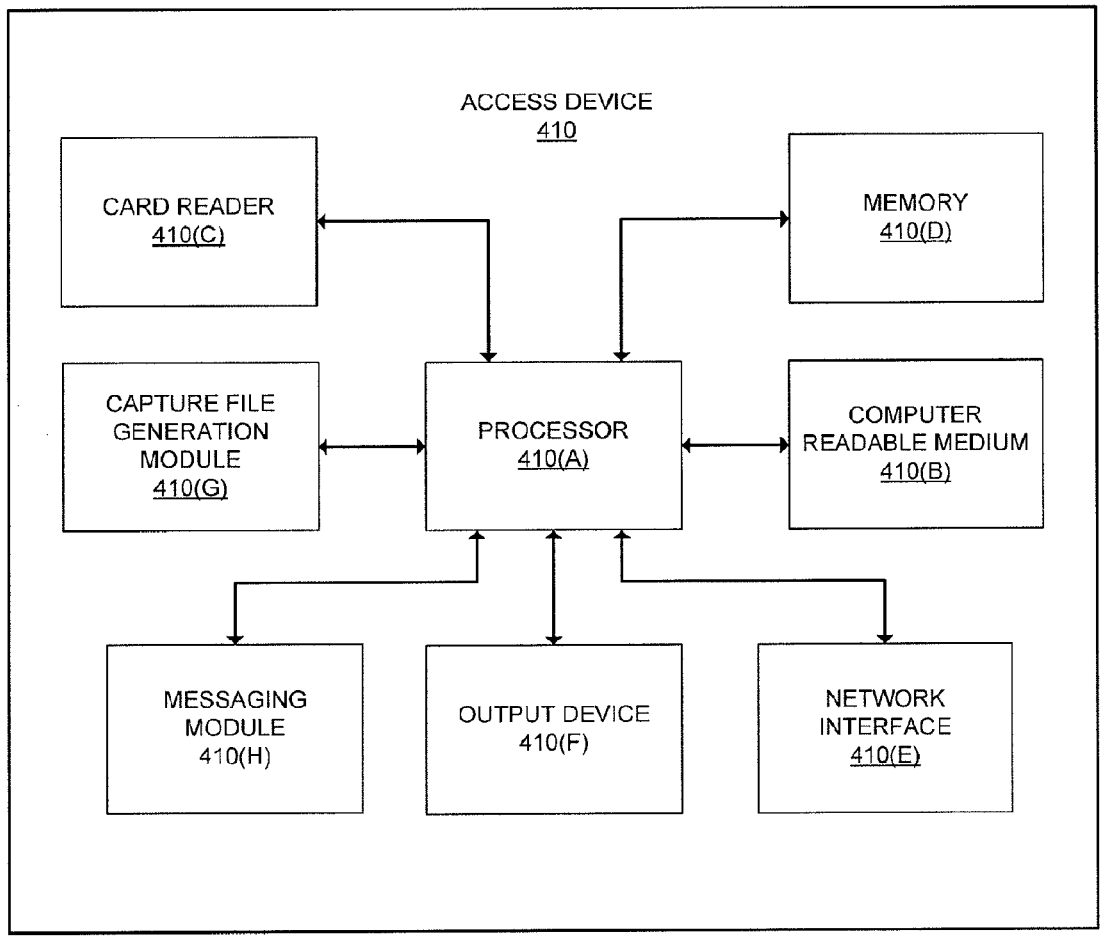
FIG. 4 is a block diagram of an exemplary access device according to embodiments of the invention.

FIG. 4 shows a block diagram with basic components that may reside in an exemplary access device 410. The access device 410 may comprise a processor 410(A). It may also comprise a computer readable medium 410(B), a card reader 410(C), a memory 410(D), a network interface 410(E), an output device 410(F), a capture file generation module 410

(G), and a messaging module 410(H), all operatively coupled to the processor 410(A). A housing may house one or more of these components. Exemplary portable consumer device readers 410(C) can include RF (radio frequency) antennas, magnetic stripe readers, etc., that can interact with the card 100. Suitable output devices 210(F) may include displays and audio output devices. Exemplary computer readable media may include one or more memory chips, disk drives, etc.

As explained above, existing metal cards are prone to causing electrostatic discharge (ESD) events when interacting with an access device to conduct a payment transaction. To determine the susceptibility of a payment card to ESD, operation of the payment card can be simulated in a controlled environment to determine whether the payment card, and its various components, might result in current and energy levels that can cause interruption of a payment transaction or damage to an access device (e.g., a point of sale terminal). Various test methods can be implemented that measure capacitance of the payment card, current and energy levels that result from an ESD event, and dynamic resistance of the payment card when interacting with an access device.

Measuring the capacitance of a payment card indicates the amount of charge that the card can hold. An ESD event can be related to the amount of charge that a payment card retains. Measuring the current levels and calculating the energy levels that result from an ESD event can determine the current and energy levels that can be expected from the payment card in various conditions. Measuring the dynamic resistance of the payment card can determine the ability of the card to impede the occurrence of an ESD event.

Any suitable testing method can be used. For example, testing methods can evaluate a payment card in a manner that replicates use in the field by simulating a person who has become charged through certain activities and then causes the payment card to interact with an access device. Testing methods can also rely on the measurement of the peak discharge current (Ip) generated and its corresponding discharge energy when a payment card is charged to a specific voltage level and then caused to interact with an access device.

According to an exemplary testing method, a preparation step can be performed prior to a series of test procedures. The preparation step can be performed by placing a payment card, a charge/discharge device, an access device (e.g., a payment terminal), and test equipment, in a controlled environment. The controlled environment conditions the payment card and test equipment by maintaining a relative humidity and temperature that simulates the operating conditions in the field.

After the preparation steps, a first test procedure can be performed. This first test procedure can be performed by measuring the capacitance of the conductive components (e.g., magnetic stripe, hologram, antenna, etc.) of the payment card using a capacitance measure fixture and a capacitance meter. Capacitance is a measure of the amount of charge that can be stored in a given component on the payment card. This preparation step may indicate the amount of charge that the payment device is capable of retaining.

A second test procedure can be performed comprising a number of sub-procedures which may include measuring various current levels using the charge/discharge device, a current transducer and an oscilloscope. The current levels may be the result of electrostatic discharge of the payment card when inserted into the charge/discharge device. The second test procedure may comprise a normal insertion of the payment card into a charge/discharge fixture, insertion of the payment card into the charge/discharge device after performing a pre-defied physical activity (e.g. walking) to charge the payment device with electrostatic charge, and insertion of the payment card into the charge/discharge device after charging the payment card and the operator (user) to a predetermined voltage level (e.g., 10 kV). Also in this test, energy levels of each of the current levels can be calculated. Calculating the energy levels can performed by a computer system running an energy calculation program.

A third test procedure can be performed comprising calculating the dynamic resistance of the payment card from one of the current levels that was measured in the second test procedure.

A fourth test procedure can be performed comprising four sub-procedures, for example. The first three sub-procedures may be similar to the second test procedure except a known ESD sensitive access device can be used instead of the charge/discharge device. The last sub-procedure may comprise rubbing the payment card against various types of clothing material (e.g. cotton, nylon, wool, and leather) and each time measuring the current level using the access device that is known to be sensitive to electrostatic discharge, a current transducer and an oscilloscope.

A reference current level equal to or greater than the highest of the current levels that are measured in the second test procedure can be determined at the conclusion of the second test procedure. This reference current level can be the actual reference threshold level that the payment card can produce without causing damage or malfunction to an access device from an ESD event. Also, a corresponding energy level for each of the current levels from the second test procedure can be calculated and a reference energy level equal to or greater than the highest of the energy levels can be determined.

Using the above test procedures, the following threshold conditions may indicate that a payment card can safely interact with an access device without risking damage or interruption of the transaction due to an ESD event:

(1) Capacitance of a magnetic stripe or other conductive component that makes contact with the access device can have an inductance of less than about 2.0 picofarads (measurement obtained by first test procedure above);

(2) Capacitance of a contactless element installed on the payment card can have an inductance of less than about 5.0 picofarads (measurement obtained by first test procedure above);

(3) Discharge current after normal operation of the payment card can be less than about 250 milliamps (measurement obtained by second test procedure above);

(4) Discharge current when the payment card is charged to about 10 kilovolts can be less than about 250 milliamps (measurement obtained by second test procedure above);

(5) Discharge energy when the payment card is charged to about 10 kilovolts can be less than about 15 nanojoules (measurement obtained by second test procedure above);

(6) Discharge energy of a magnetic stripe or other conductive component that makes contact with the access device when the payment card is charged to about 10 kilovolts can be less than about 500 nanojoules (measurement obtained by second test procedure above);

(7) Dynamic resistance of a magnetic stripe at a peak current discharge (Ip) of about 20 kilovolts can be greater than about 5.0 kiloohms (measurement obtained by third test procedure above); and (8) Discharge current after rubbing the payment card against the various types of clothing material can be less than about 250 milliamps (measurement obtained by fourth test procedure above).

In another embodiment of the invention, testing methods can include comparing the performance of a payment card against the performance of a carbon-based magnetic stripe card in terms of electrical attributes during an ESD event. For example, a number of testing procedure can be used to test a payment card, such as an ESD model and magnitude comparison via a specially designed test setup not including a terminal, an ESD magnitude and polarity comparison performed using a terminal read head, determining the voltage level developed on the payment card when rubbed against another card, leather, nylon, cotton, and/or other common clothing material to provide an indication of voltage levels and polarity of electric charge that can develop on a payment card during normal handling, and any other suitable testing procedure. Using carbon-based magnetic stripe cards as a reference, one or more threshold values can be defined which may indicate that the payment card being tested is unlikely to cause a damaging ESD event. For example, the peak current discharged by the payment card can be less than about 1000 milliamps when the payment card is charged to about 10 kilovolts, the payment card can have a capacitance less than about 2 picofarads, the dynamic resistance of the payment card can be greater than about 1 kiloohm, and the discharge energy of the payment card can be less than about 15 nanojoules.

Different zones can be defined on a payment card for testing purposes. For example, a first zone can identify "unsafe" areas in which a magnetic stripe terminal read head directly contacts the card during a normal swipe or an upside-down swipe. The first zone may also represent the portion of the card that is held by a user when a card is swiped. A second zone can be defined for on-component measurements. A third zone can be defined by the points defined for the first zone and the points defined for second zone. Additional and/or alternate zones for testing can be used. For example, points at different distances from the edge of a payment card may be selected. In addition, more or fewer points may be selected for each of the one or more zones.

One or more test conditions may be used. For example, the testing environment may be equal or less than about 20% relative humidity, and the payment card to be tested (and any control cards) may be stored in an environment having about 12% relative humidity for 24 hours with enforced air around the payment cards.

In an exemplary testing procedure, a payment card can be placed on an insulated surface, and a grounding probe can be positioned at a first location on the payment card. The discharge probe can be charged to a known voltage level (e.g., about 10 kilovolts), and the discharge probe can be discharged at a second location on the payment card. The discharge wave shape from the ground probe can then be recorded to determine if the threshold conditions are satisfied. If the payment card has a magnetic stripe, the grounding probe can be positioned on the magnetic stripe along a first edge of the payment card, a discharge probe can be charged to a known voltage level (e.g., about 10 kilovolts), and the discharge probe can be discharged on the magnetic stripe along a second edge of the payment card opposite the first edge. The discharge wave shape from the ground probe can be measured to determine if threshold conditions are satisfied.

In another exemplary testing procedure, a read head (e.g., the read head of a point of sale terminal) can be connected to a ground voltage level. A discharge probe can be charged to a known voltage level (e.g., about 10 kilovolts) and then discharged at a first location on a payment card held by an operator to charge the payment card and the operator to the known voltage level. The payment card can be placed in contact with the read head at a second location on the payment card, and the discharge wave shape from the ground probe can be measured to determine if threshold conditions are satisfied. The peak voltage and voltage wave shape at the read head, and any abnormalities exhibited by the terminal can also be measured and recorded.

In another exemplary testing procedure, a payment card (or a magnetic stripe on the payment card) can be charged to a known voltage level (e.g., about 10 kilovolts) and swiped through a terminal to determine if any abnormalities are exhibited by the terminal. Alternatively, the payment cad can be rubbed against a conductive material and then swiped through the terminal and the results measured and recorded.

In another exemplary testing procedure, capacitance of a payment card can be measured by placing the payment card on a metal surface such that a first side of the payment card contacts the metal surface and a second side of the payment card having a magnetic stripe and opposite the first side does not contact the metal surface. The capacitance can be measured to determine if threshold conditions are satisfied.

Further details regarding ESD testing of payment cards can be found in U.S. application Ser. No. 13/348,562, filed Jan. 1, 2012, entitled "SYSTEMS AND METHODS TO DEFINE POSSIBLE ESD RISK," and in U.S. application Ser. No. 12/016,947, filed Jan. 18, 2008, now U.S. Pat. No. 7,902,831, entitled "METHOD OF PERFORMING ELECTROSTATIC DISCHARGE TESTING ON A PAYMENT CARD," which are herein incorporated by reference in their entirety for all purposes.

By utilizing a composite of metal particles 108 and polymer 110 the card 100, according to embodiments of the invention, can have the look and feel of metal, without the ESD problems associated with metal cards. For example, according to embodiments of the invention, when the card 100 is subjected to one or more of the testing procedures described above, the measurements of capacitance, peak discharge current, energy, and dynamic resistance may satisfy the determined threshold conditions or values indicating that the card 100 can safely interact with the access device 410 without risking damage or interruption of the transaction due to an ESD event.

Figure 3:
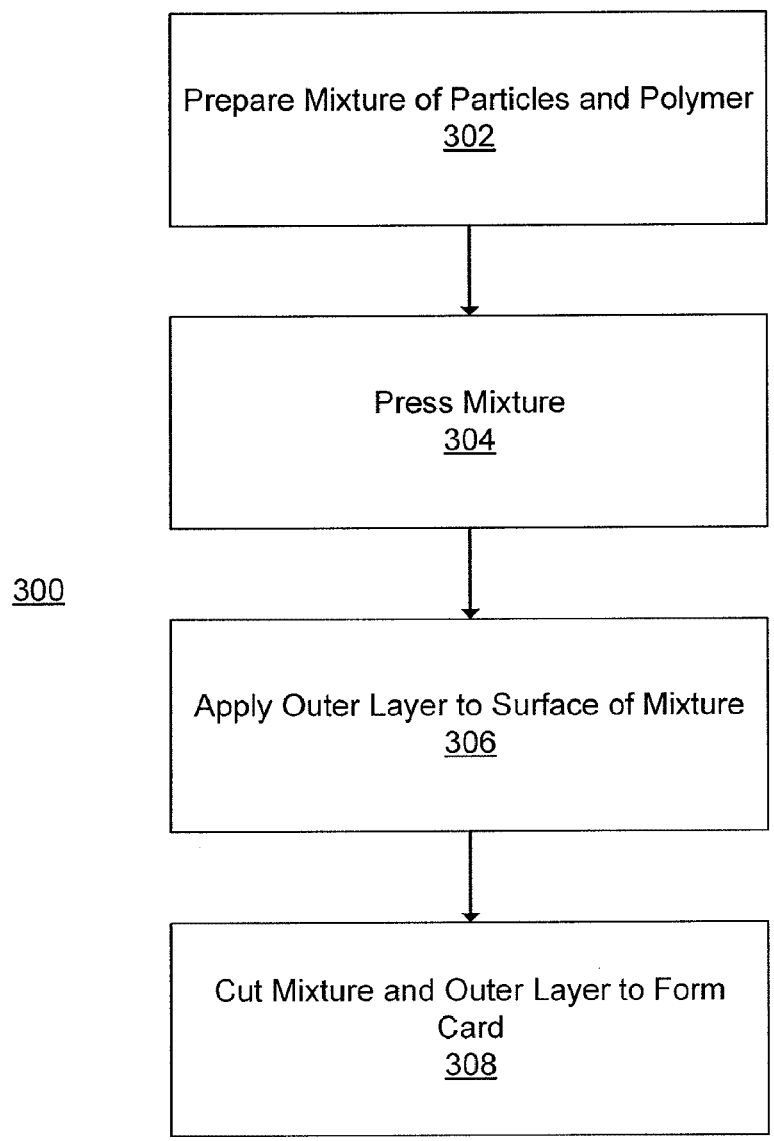
FIG. 3 is a flow diagram that shows a method of making a card according to embodiments of the invention.

FIG. 3 is a flow diagram that shows a method 300 of making the card 100 according to embodiments of the invention. At step 302, a mixture is prepared comprising the plurality of metal particles 108 and the polymer 110. A plasticizer can also be introduced into the mixture. A plasticizer is an additive that increases the plasticity or fluidity of materials such as polymers. Due to the metal particles 108 in the mixture, the fluidity of the polymer 110 may be reduced which can lead to processing difficulties. The addition of the plasticizer can increase the fluidity and thus improve ease of processing. The metal particles 108 can comprise at least about 15 volume % of the mixture, and thus the amount of plasticizer to be added, if any is added, may depend on the desired volume % of the metal particles 108. Diisooctyl phthalate, butyl benzyl phthalate, or any other suitable plasticizer can be used. A thermal stabilizer such as a lead salt, metal soap, or organo-tin compound can also be added to the mixture to maintain the integrity of the polymer 110. Polymers such as polyvinyl chloride can degrade at high temperatures. Since the mixture can be prepared at a process temperature of about 120 to 200 degrees Celsius, the addition of a thermal stabilizer can help maintain the physical properties of the polymer 110.

At step 304, the mixture can be pressed at a processing temperature of about 120 to 200 degrees Celsius and at an applied pressure of about 5 to 20 tons per square foot to a thickness slightly less than that desired for the finished card 100 to account for a laminated outer layer described below. If the polymer 110 comprises PVC, a preferred process temperature of about 160 degrees Celsius can be used for optimal fluidity of the mixture without noticeable degradation of the PVC. The mixture can be pressed using any suitable process. For example, the mixture can be transferred to an extrusion molding apparatus that forces the mixture though a die to form a sheet. The sheet can then be further pressed by one or more rollers to the desired thickness. Injection molding or any other suitable process can also be used in lieu of a continuous extrusion process.

Aesthetic features can be added after the mixture has been pressed. For example, pigments can be added and graphics, logos, holograms, cardholder name, account number, expiration date, etc. can be printed onto a surface of the pressed mixture.

At step 304, an outer layer (such as the first layer 102 or the third layer 106 shown in FIG. 1) can be applied to a surface of the pressed mixture using any suitable lamination process. For example, a transparent polymer sheet with a thickness of about 50.8 to 127 microns and comprising PVC, Polyvinyl chloride acetate, or any other suitable transparent material can be positioned onto the surface of the mixture. The mixture and the transparent sheet can then be pressed (e.g., with metal platens or rollers) at about 5 to 20 tons per square foot of pressure, and at a process temperature of about 120 to 200 degrees Celsius. After application of the outer layer, the combined thickness of the pressed mixture and outer layer can be about 0.7 to 0.9 millimeters. A magnetic stripe imprinted with magnetic ink and any of the aesthetic features described above can be added to the outer layer before or at step 304.

At step 306, the mixture and outer layer can be cut to form the card 100. Cutting can be accomplished in any suitable manner. For example, the laminated mixture can be cut using conventional shearing (e.g., die cutting) methods to form cards that are about 86 millimeters long and about 54 millimeters wide (e.g., the dimensions of a typical payment card).

At step 306 (or step 304) various embossing techniques can be used to create raised features on the card 100. For example, a combination of heat and pressure can be applied to the card 100 to cause a printed account number to be raised on a surface of the card 100. Contactless elements can also be introduced at step 306 (or step 304). For example, a small cavity can be cut in the card 100 and contactless elements such as a computer readable medium, processor, and/or antenna can be inserted into the cavity which can then be filled and covered by subsequent lamination steps.

EXAMPLES

In a C.W. Brabender® mixing tool, the following components were combined at 155 degrees Celsius for 10 minutes: (a) 20 grams of PVC powder (grade OV155 produced by OxyVinyls); (b) 0.2 grams of thermal stabilizer (Mark292 produced by Gallade Chemical); (c) 1 gram of dioctyl pthallate plasticizer; and (d) 200 grams of tungsten powder (Technon™ produced by Tunsgten Heavy Powders), the tungsten particles having an approximate diameter of 40 microns or greater and an approximate size distribution of 100 to 400 Mesh.

The mixture was then pressed at 160 degrees Celsius and at an applied pressure of 5 to 20 tons per square foot resulting in a mixture with a thickness of approximately 0.66 millimeters.

The pressed mixture was then trimmed, using a shear machine, into a rectangle slightly larger than a typical payment card (e.g., 86 millimeters long and 54 millimeters wide).

The trimmed and pressed mixture was then laminated on both sides with an outer layer of transparent PVC 50.8 to 127 microns thick at 160 degrees Celsius and at an applied pressure of 5 to 20 tons per square foot. The desired thickness of the outer layer was achieved by controlling the flow of the PVC.

The laminated mixture was then trimmed, using a shear machine, to form a card with approximate dimensions of 86 millimeters long and 54 millimeters wide and a thickness of 0.76 to 0.91 millimeters.

Figure 5:
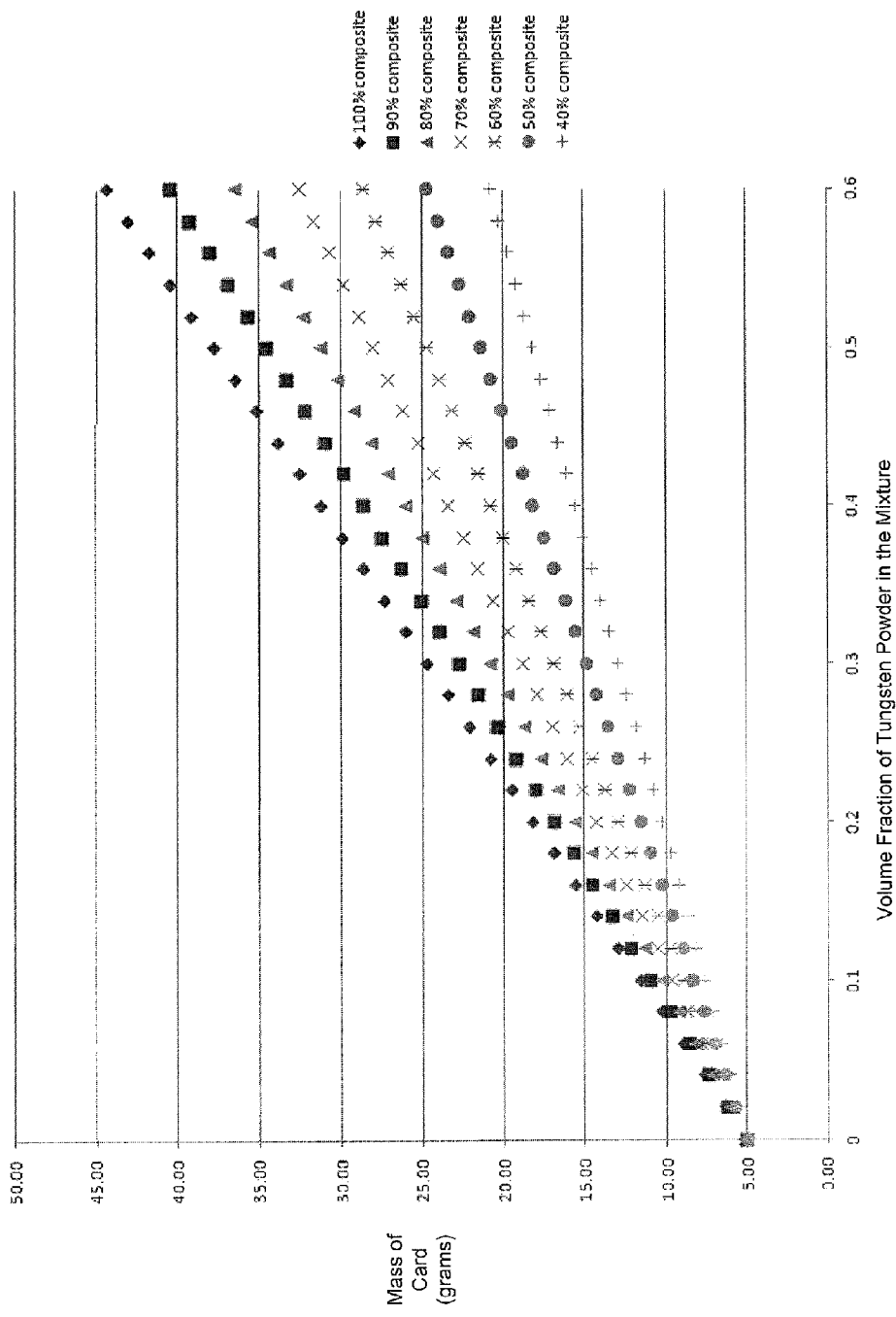
FIG. 5 is a graph of the change in mass of a card as a function of volume % of the metal particles in the second layer/mixture and as a function of volume % of the second layer/mixture in the card according to embodiments of the invention.

The above experiment was repeated with different values for the volume % of the tungsten in the mixture and the volume % of the mixture in the overall card. The results are shown in FIG. 5. A typical payment card weighs approximately 5 grams. As seen in FIG. 5, a metal particle volume % of 40% and a mixture volume % of 90% resulted in a card weighing nearly 30 grams, 6 times the weight of a typical payment card.

Further experiments indicated that the flexibility of the card is a function of the tungsten powder/polymer mixture and the laminated PVC layers. Properties of the mixture were found to be influenced by the molecular weight of the chosen polymer, the amount and type of plasticizer used, the volume % of the tungsten particles, and interface chemistry at the polymer/tungsten particle interface.

A surprising result of the above experiments was that even when the volume % of tungsten particles in the mixture was high (e.g., greater than 40%), the conductivity of the overall card remained negligible. Although this result is not completely understood, it is possible that the polyvinyl chloride forms an insulating layer on the surface of the tungsten particles during the mixing step.

The above descriptions are illustrative and are not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

A recitation of "a", "an" or "the" is intended to mean "one or more" unless specifically indicated to the contrary.

What is claimed is:

1. A card comprising:
   a first layer comprising a polymer;
   a second layer adjacent to the first layer and comprising a composite, wherein the composite comprises a polymer and a plurality of particles comprising a metal, wherein the plurality of particles further comprise about 15 to 50 volume % of the second layer, and wherein the composite is less susceptible to electrostatic buildup than the metal; and
   a third layer adjacent to the second layer and opposite the first layer, wherein the third layer comprises a polymer.

2. The card of claim 1, wherein the plurality of particles further comprise an outer coating.

3. The card of claim 1, wherein the metal comprises tungsten.

4. The card of claim 1, wherein the polymer of the second layer comprises polyvinyl chloride.

5. The card of claim 1, wherein the card is about 86 millimeters long, about 54 millimeters wide, and about 0.7 to 0.9 millimeters thick.

6. The card of claim 1, wherein the card further comprises a magnetic stripe and a contactless element.

7. The card of claim 6, wherein the card is adapted to exhibit a peak current discharge less than about 1000 milliamps when the card is charged to about 10 kilovolts and interacting with an access device.

8. The card of claim 7, wherein the card is adapted to exhibit a discharge energy less than about 15 nanojoules when the card is charged to about 10 kilovolts, the magnetic stripe is adapted to exhibit a dynamic resistance greater than about 1 kiloohms at a peak current discharge of about 10 kilovolts, a capacitance less than about 2 picofarads, and a discharge energy of less than about 500 nanojoules when the magnetic stripe is charged to about 10 kilovolts, and the contactless element is adapted to exhibit a capacitance less than about 5 picofarads, when the card interacts with an access device.

9. A method for making a card, the method comprising:
preparing a mixture comprising:
a plurality of particles comprising a metal, wherein the plurality of particles further comprise about 15 to 50 volume % of the mixture; and
a polymer;
pressing the mixture to form a composite layer, wherein the composite layer is less susceptible to electrostatic buildup than the metal;
applying a first outer layer to a first surface of the composite layer, wherein the first outer layer comprises a polymer;
applying a second outer layer to a second surface of the composite layer, wherein the second surface is opposite the first surface of the composite layer, and wherein the second outer layer comprises a polymer; and
cutting the composite layer, the first outer layer, and the second outer layer to form the card.

10. The method of claim 9, wherein the mixture further comprises a plasticizer and a thermal stabilizer.

11. The method of claim 9 further comprising applying an outer coating to the plurality of particles prior to preparing the mixture.

12. The method of claim 9, wherein the metal comprises tungsten.

13. The method of claim 9, wherein the polymer of the composite layer comprises polyvinyl chloride.

14. The method of claim 9, wherein the mixture is prepared at a process temperature of about 120 to 200 degrees Celsius.

15. The method of claim 9, wherein the mixture is pressed at a pressure of about 5 to 20 tons per square foot.

16. The method of claim 9, wherein the first or second outer layer further comprises a pigment.

17. The method of claim 9, wherein the first or second outer layer further comprises a magnetic stripe.

18. The method of claim 9 further comprising adding a contactless element to the card.

* * * * *